US012558994B2

(12) United States Patent (10) Patent No.: US 12,558,994 B2
Namuduri et al. (45) Date of Patent: Feb. 24, 2026

(54) ELECTRIC VEHICLE ENERGY STORAGE SYSTEMS INCLUDING DC-DC POWER CONVERTERS OPERABLE IN SELECTED OPERATING MODES

(71) Applicant: GM GLOBAL TECHNOLOGY OPERATIONS LLC, Detroit, MI (US)

(72) Inventors: Chandra S. Namuduri, Troy, MI (US); Mohamed Ahmed Kamel Ahmed, Birmingham, MI (US); Muhammad Hussain Alvi, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 580 days.

(21) Appl. No.: 18/097,379

(22) Filed: Jan. 16, 2023

(65) Prior Publication Data

US 2024/0239236 A1 Jul. 18, 2024

(51) Int. Cl.
B60L 53/18 (2019.01)
B60L 58/18 (2019.01)

(52) U.S. Cl.
CPC ........... B60L 58/18 (2019.02); B60L 2210/10 (2013.01); B60L 2240/525 (2013.01); B60L 2240/527 (2013.01); B60L 2240/529 (2013.01)

(58) Field of Classification Search
CPC ................. B60L 58/18; B60L 2210/10; B60L 2240/525; B60L 2240/527; B60L 2240/529; B60L 58/20; H02J 7/0013; H02J 7/00032; H02J 7/00304; H02J 7/00308; H02J 7/00309; H02J 7/0034; H02J 7/0063;
(Continued)

(56) References Cited

U.S. PATENT DOCUMENTS 6,154,381 A 11/2000 Kajouke et al.
2010/0315043 A1* 12/2010 Chau ....................... B60L 58/18
320/134
(Continued)

FOREIGN PATENT DOCUMENTS

CN 113978256 A 1/2022
DE 19805926 A1 8/1999
(Continued)

OTHER PUBLICATIONS

German Office Action from counterpart DE1020231210084, dated Dec. 2, 2025.

*Primary Examiner* — Paul Dinh

(57) ABSTRACT

An energy storage system includes a plurality of batteries coupled in series, a plurality of DC-DC power converters each having first and second sides, a DC bus coupled to the second sides of the DC-DC power converters, and at least one controller coupled to at least one DC-DC power converter. Each of the DC-DC power converters is configured to operate in a plurality of operating modes. The at least one controller configured to receive a plurality of operating characteristics of the at least one DC-DC power converter and a plurality of setpoints, select an operating mode of the plurality of operating modes for the at least one DC-DC power converter, and control the at least one DC-DC power converter to operate in the selected operating mode based on at least one of the operating characteristics and at least one of the setpoints.

20 Claims, 5 Drawing Sheets

(58) Field of Classification Search
CPC ........ H02J 7/007; B60R 16/02; B60R 16/023;
B60R 16/03; H02M 3/33573; H02M
3/33584
USPC ........................................................ 320/127
See application file for complete search history.

(56) References Cited

U.S. PATENT DOCUMENTS

| | | | |
|---|---|---|---|
| 2016/0241028 A1 | 8/2016 | Long | |
| 2021/0006076 A1* | 1/2021 | Rentel | H02J 7/0014 |
| 2022/0402390 A1* | 12/2022 | Smolenaers | B60L 53/22 |

FOREIGN PATENT DOCUMENTS

| | | |
|---|---|---|
| DE | 102010009260 A1 | 8/2011 |
| DE | 102011083203 A1 | 5/2012 |
| DE | 102015214231 A1 | 2/2017 |
| DE | 102017218252 A1 | 4/2019 |

* cited by examiner

ELECTRIC VEHICLE ENERGY STORAGE SYSTEMS INCLUDING DC-DC POWER CONVERTERS OPERABLE IN SELECTED OPERATING MODES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to energy storage systems, and more particularly to energy storage systems including multiple DC-DC power converters controllable to operate in selected operating modes.

Electric vehicles such as pure electric vehicles and/or plug-in hybrid electric vehicles include DC-DC power converters for powering a low voltage load. The DC-DC power converters are controlled to share a low voltage load current equally or differentially with output voltage regulation.

SUMMARY

An energy storage system for an electric vehicle includes a plurality of batteries coupled in series, a plurality of DC-DC power converters each having first and second sides, each of the first sides coupled to one of the batteries, a DC bus coupled to the second sides of the plurality of DC-DC power converters, and at least one controller coupled to at least one DC-DC power converter of the plurality of DC-DC power converters. The second sides of the DC-DC power converters are coupled in parallel, and each of the DC-DC power converters is configured to operate in a plurality of operating modes. The DC bus is configured to supply power to one or more loads. The at least one controller configured to receive a plurality of operating characteristics of the at least one DC-DC power converter and a plurality of setpoints, select an operating mode of the plurality of operating modes for the at least one DC-DC power converter, and control the at least one DC-DC power converter to operate in the selected operating mode based on at least one of the plurality of operating characteristics and at least one of the plurality of setpoints.

In other features, the plurality of operating modes includes a voltage control mode, a current control mode, and a power control mode.

In other features, the at least one controller is a first controller, the at least one DC-DC power converter is a first DC-DC power converter, the plurality of setpoints is a first plurality of setpoints, and the energy storage system further includes a second controller coupled to a second DC-DC power converter of the plurality of DC-DC power converters. The second controller is configured to receive a plurality of operating characteristics of the second DC-DC power converter and a second plurality of setpoints, select an operating mode of the plurality of operating modes for the second DC-DC power converter, and control the second DC-DC power converter to operate in the selected operating mode based on at least one of the plurality of operating characteristics of the second DC-DC power converter and at least one of the second plurality of setpoints.

In other features, the at least one controller is configured determine whether a communication link between the at least one controller and another controller is active, and in response to determining the communication link is active receive, via the communication link, a signal identifying the operating mode and select the operating mode of the plurality of operating modes based on the received signal.

In other features, the at least one controller is configured select a defined default mode as the operating mode in response to determining the communication link is inactive.

In other features, the at least one controller is configured to select the defined default mode in response to the communication link being inactive for a defined period of time.

In other features, the defined default mode includes one of a voltage control mode, a current control mode, and a power control mode.

In other features, the plurality of DC-DC power converters include at least one of a bi-directional DC-DC power converter or an unidirectional DC-DC power converter.

In other features, each of the plurality of DC-DC power converters has the same converter topology, or the at least one DC-DC power converter has a different converter topology than another one of the plurality of DC-DC power converters.

In other features, the at least one controller is configured to determine whether one of the received operating characteristics of the at least one DC-DC power converter exceeds a defined limit threshold, and in response select another operating mode based on the one of the received operating characteristics and control the at least one DC-DC power converter to operate in the other operating mode.

In other features, the other operating mode includes at least one of a voltage limit mode, a current limit mode, a power limit mode, and a temperature limit mode.

In other features, an electric vehicle includes the energy storage system and one or more loads coupled to the energy storage system.

A method for controlling a plurality of DC-DC power converters of an energy storage system is provided. Each DC-DC power converter has first and second sides. Each of the first sides is coupled to one of a plurality of batteries of the energy storage system, and the second sides are coupled in parallel and to a DC bus. Each of the DC-DC power converters is configured to operate in a plurality of operating modes. The method includes receiving a plurality of operating characteristics of at least one DC-DC power converter of the plurality of DC-DC power converters and a plurality of setpoints, selecting an operating mode of the plurality of operating modes for the at least one DC-DC power converter, and controlling the at least one DC-DC power converter to operate in the selected operating mode based on at least one of the received operating characteristics and at least one of the received set points.

In other features, the plurality of operating modes includes a voltage control mode, a current control mode, and a power control mode.

In other features, the method further includes receiving a signal identifying the operating mode, and selecting the operating mode for the at least one DC-DC power converter includes selecting the operating mode based on the received signal.

In other features, selecting the operating mode for the at least one DC-DC power converter includes selecting a defined default mode as the operating mode.

In other features, selecting the defined default mode as the operating mode includes selecting the defined default mode in response to a communication link being inactive for a defined period of time.

In other features, the method further includes determining whether one of the received operating characteristics of the at least one DC-DC power converter exceeds a defined limit threshold, and in response selecting another operating mode based on the one of the received operating characteristics and controlling the at least one DC-DC power converter to operate in the other operating mode.

In other features, the other operating mode includes at least one of a voltage limit mode, a current limit mode, a power limit mode, and a temperature limit mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An EV includes distributed DC-DC power converters that convert a voltage from one or more batteries to a lower voltage for a low voltage load coupled to the power converters. In such examples, the power converters may provide redundancy for the low voltage load. The power converters are controlled to share a low voltage load current equally or differentially while regulating the load voltage. In some instances, however, it may be desirable to regulate another electrical characteristic of one or more of the DC-DC power converters such as an input or output current, an input voltage, etc.

An ESS according to the present disclosure includes multiple DC-DC power converters each controllable to operate in a selected operating mode such as a voltage control mode, a current control mode, a power control mode, etc. based on one or more received operating characteristics and setpoints. This flexibility to control the power converters in different operating modes enables the power converters to regulate specific electrical characteristics of the power converters for supporting low voltage loads, while also maintaining a target state of charge of batteries.

Figure 1:
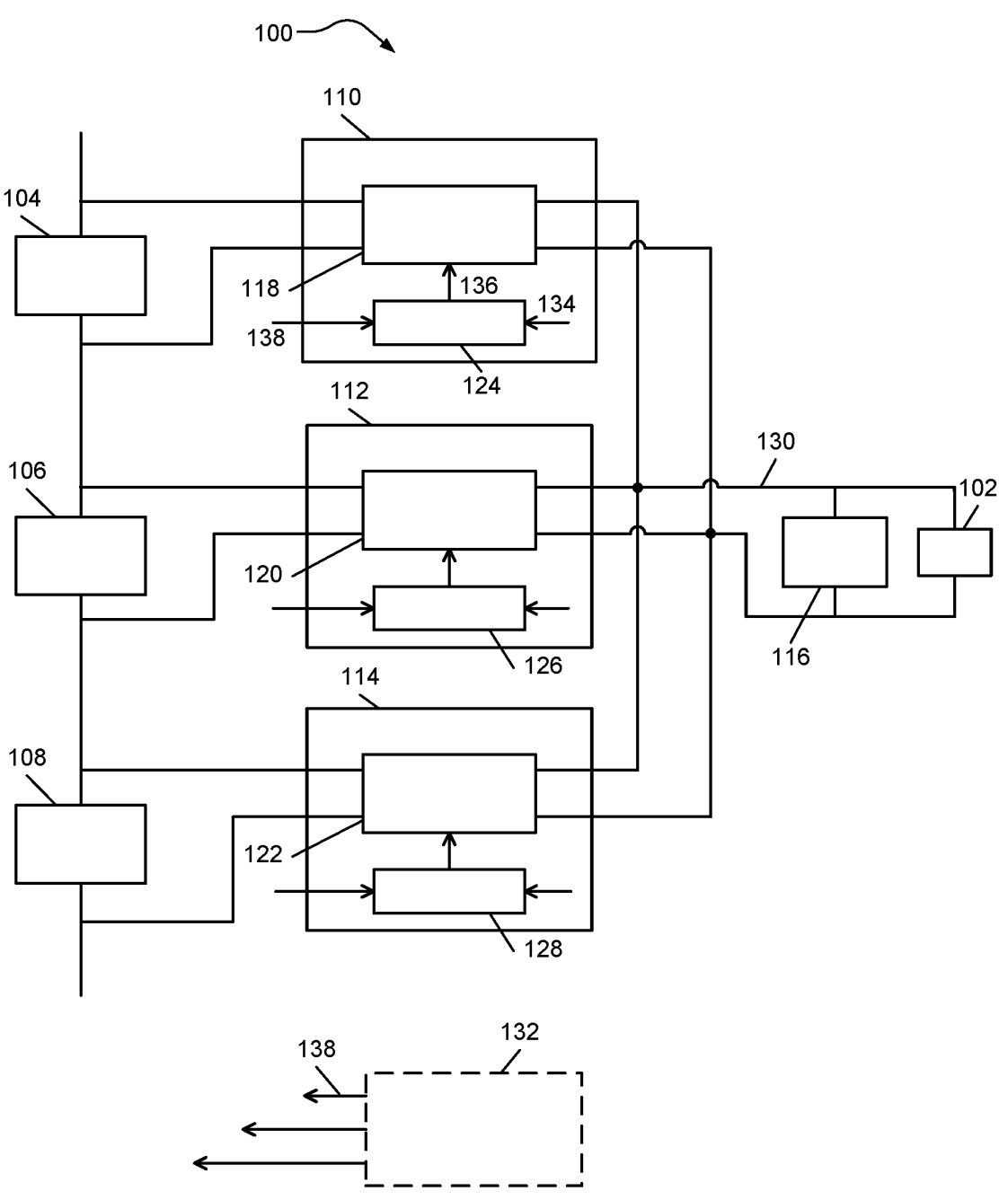
FIG. 1 is a functional block diagram of an energy storage system (ESS) including multiple DC-DC power converters according to the present disclosure.

Referring now to FIG. 1, an ESS 100 and a low voltage load 102 coupled to the ESS 100 are shown. The ESS 100 includes multiple batteries (e.g., battery modules) 104, 106, 108 (e.g., 2.5V up to 400V, etc.) coupled in series, multiple DC-DC power converters 110, 112, 114, and a low voltage battery (e.g., battery module) 116 (e.g., 12V, etc.) coupled to the DC-DC power converters 110, 112, 114 via a DC bus 130. Each battery 104, 106, 108, 116 may include one or more cells. Although the ESS 100 of FIG. 1 is shown as including three batteries 104, 106, 108, three power converters 110, 112, 114 and one low voltage battery 116, it should be appreciated that the ESS 100 may include more or less batteries, more or less power converters, more or less low voltage loads, and/or more than one low voltage battery in other embodiments.

As shown in FIG. 1, the DC-DC power converters 110, 112, 114 each include a power converter circuit 118, 120, 122 operable in different operating modes and a controller 124, 126, 128, respectively, coupled to the power converter circuit 118, 120, 122 for controlling the power converter circuit 118, 120, 122. While each power converter 110, 112, 114 of the ESS 100 is shown as including a dedicated controller, it should be appreciated that one or more of the power converters 110, 112, 114 may not include a dedicated controller. In such embodiments, one or more of the converter circuits 118, 120, 122 may be controlled by a system controller such as a controller 132 shown in dashed lines in FIG. 1.

Each of the converter circuits 118, 120, 122 has opposing sides. One side (e.g., a high voltage side) of each converter circuit 118, 120, 122 is coupled to individual ones of the batteries 104, 106, 108. For example, and as shown in FIG. 1, the converter circuit 118 is coupled to the battery 104, the converter circuit 120 is coupled to the battery 106, and the converter circuit 122 is coupled to the battery 108. Each of the other sides (e.g., low voltage sides) of the converter circuits 118, 120, 122 are coupled in parallel and to the DC bus 130.

The converter circuits 118, 120, 122 may operate unidirectionally or bi-directionally. For example, and as further explained below, the converter circuits 118, 120, 122 may include a converter topology that allows power to flow in only one direction (e.g., from the high voltage side to the low voltage side) or both directions. When the converter circuits 118, 120, 122 operate bi-directionally, power may flow towards the low voltage battery 116 and the low voltage load 102. In such examples, the converter circuits 118, 120, 122 provide redundancy for the low voltage load 102, share a low voltage load current equally or differentially, and/or recharge or otherwise maintain a target state of charge of the low voltage battery 116. Power may also flow towards the batteries 104, 106, 108 for recharging or otherwise maintaining a target state of charge of the batteries 104, 106, 108.

The controllers 124, 126, 128 are each configured to control the converter circuits 118, 120, 122 to operate in a selectable operating mode to regulate an electrical characteristic associated with the converter circuits 118, 120, 122. For example, the operating mode may include a voltage control mode in which voltages (e.g., on the high voltage sides or low voltage sides) of the converter circuits 118, 120, 122 are regulated, a current control mode in which currents (e.g., on the high voltage sides or low voltage sides) of the converter circuits 118, 120, 122 are regulated, or a power control mode in which power (e.g., on the high voltage sides or low voltage sides) of the converter circuits 118, 120, 122 is regulated.

The controllers 124, 126, 128 may receive operating characteristics of the converter circuits 118, 120, 122 and setpoints (e.g., reference values) associated with the operating characteristics. For example, the controller 124 may receive one or more input signals 134 indicative of one or more operating characteristics of the converter circuit 118, operating characteristics of the ESS 100, operating characteristics of the other converter circuits 120, 122 in the ESS 100, etc. Additionally, the controller 124 may receive setpoints associated with the operating characteristics via a communication link with the system controller 132 or another controller in the ESS 100. Then, once the operating mode is selected (as further explained below), the controller 124 controls the converter circuit 118 via one or more control signals 136 (e.g., PWM control signals, etc.) to operate in the selected operating mode based on the received operating characteristics and one of the setpoints.

The controllers 124, 126, 128 may select the operating mode in various different manners. For example, the controller 124 may receive a signal 138 identifying a set operating mode for the converter circuit 118. In such examples, the signal 138 may be received via the communication link with the system controller 132. Then, once the signal 138 is received, the controller 124 selects the operating mode of the converter circuit 118 based on the signal 138.

In other embodiments, the controller 124 may select a defined default mode as the operating mode. For example, the controller 124 may determine that the communication link with the system controller 132 is inactive. In response, the controller 124 may select a default mode stored in a memory circuit as the operating mode for the converter circuit 118. In various embodiments, the controller 124 may select the stored default mode as the operating mode for the converter circuit 118 only if the communication link is inactive for a defined period of time.

In various embodiments, the controller 124 may select the operating mode autonomously depending on an operating condition. For instance, the controller 124 may select a particular operating mode based on the received input signal(s) 134 representing operating characteristics of the converter circuit 118. In such examples, the controller 124 may compare the received operating characteristics to defined threshold limits. If any one of the operating characteristics exceeds a defined threshold limit (e.g., a minimum/maximum voltage limit threshold, a minimum/maximum current limit threshold, etc.), the controller 124 may select another appropriate operating mode. For example, the controller 124 may select a voltage limit mode, a current limit mode, a power limit mode, a temperature limit mode, etc. depending on which operating characteristics exceeds its associated threshold limit.

While the control functions are described herein with respect to the controller 124 and the converter circuit 118, it should be appreciated that the controllers 126, 128 may include similar functionality for controlling the converter circuits 120, 122. For example, the converter circuits 120, 122 each may be controlled according to an operating mode selected based on a received signal from the system controller 132 or another controller in the ESS 100, a defined default mode, an operating condition, etc. as explained herein. The operating mode selected for the converter circuits 120, 122 may the same or different than the operating mode selected for the converter circuit 118. As such, each converter circuit 118, 120, 122 may be enabled to control an operating characteristic (e.g., a current, a voltage, power, etc.) independently within predetermined limits (e.g., established by threshold limits) for input voltages varying over a wide range (e.g., 18 to 36 VDC, 18 to 54 VDC, etc.).

In various embodiments, the controllers 124, 126, 128 include one or more communication interfaces for receiving signals from and/or transmitting signals to the system controller 132. In such examples, the controllers 124, 126, 128 may receive signals including, for example, a wakeup command, an enable command, a disable command, set point values, programmable limit thresholds, etc. The communication interfaces may include, for example, an I2C interface, local interconnect network (LIN) interface, a controller area network (CAN) interface, serial peripheral interface (SPI), etc.

Additionally, the converter circuits 118, 120, 122 may include isolated outputs. For example, each converter circuit 118, 120, 122 may include a transformer or another suitable isolation device. In some examples, the converter circuits 118, 120, 122 may have an isolation rating of between about 2.25 kV and about 3.75 kV.

In various embodiments, the DC-DC power converters 110, 112, 114 each may provide a continuous output power. For example, each converter circuit 118, 120, 122 may provide a continuous output power between about 240 W and about 480 W (over −40° C. to 85° C.) with an efficiency of at least 96% at greater than 10 kW/L and greater than 5 kW/kg with voltage and current ripples within predetermined limits (e.g., less than 2% p-p of the DC values, etc.). Additionally, in some embodiments, each DC-DC power converter 110, 112, 114 may have an ultra-low quiescent power draw (e.g., less than 0.25 W, less than 1 W, etc.) when in a stand-by mode.

The converter circuits 118, 120, 122 may also have predetermined output voltage vs current characteristics suitable for paralleling (e.g., Vdroop of about 2 mV/A, etc.). Additionally, in various embodiments, each converter circuit 118, 120, 122 may be capable of withstanding a short circuit current up to 110% of a rated current and recover to normal operation when the short circuit is removed.

Additionally, in various embodiments, the DC-DC power converters 110, 112, 114 may include protection against reverse polarity battery connection on the high voltage sides and/or low voltage sides. For example, the DC-DC power converters 110, 112, 114 may include reverse current detection and/or protection to minimize (and sometimes prevent) damage cause by reverse polarity battery connection.

Figure 2:
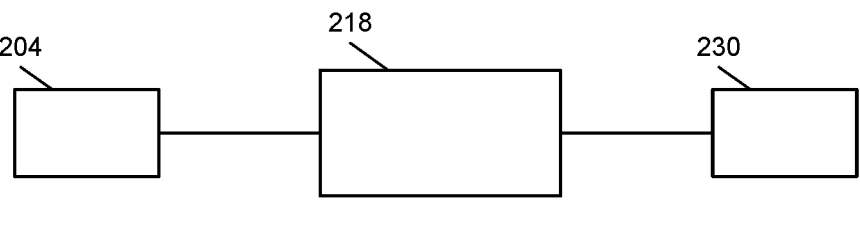
FIG. 2 is a functional block diagram of a single stage DC-DC power converter employable in the ESS of FIG. 1 according to the present disclosure.
Figure 3:
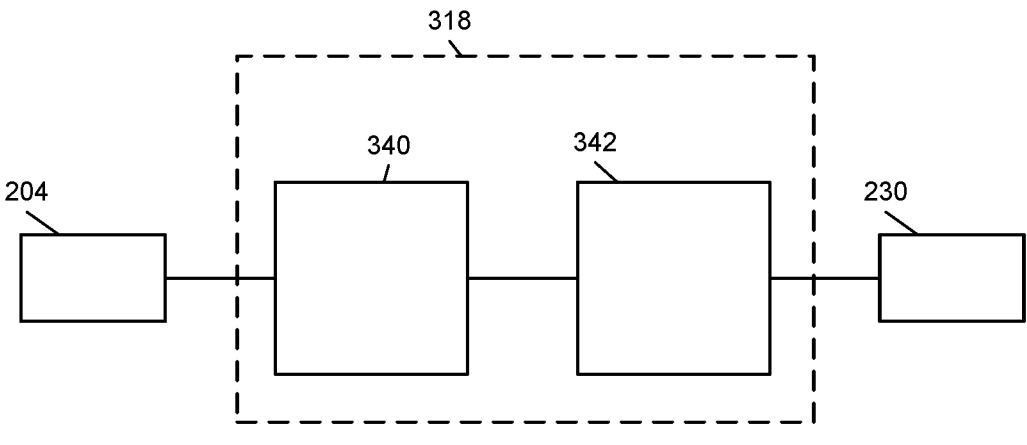
FIG. 3 is a functional block diagram of a two stage DC-DC power converter employable in the ESS of FIG. 1 according to the present disclosure.
Figure 4:
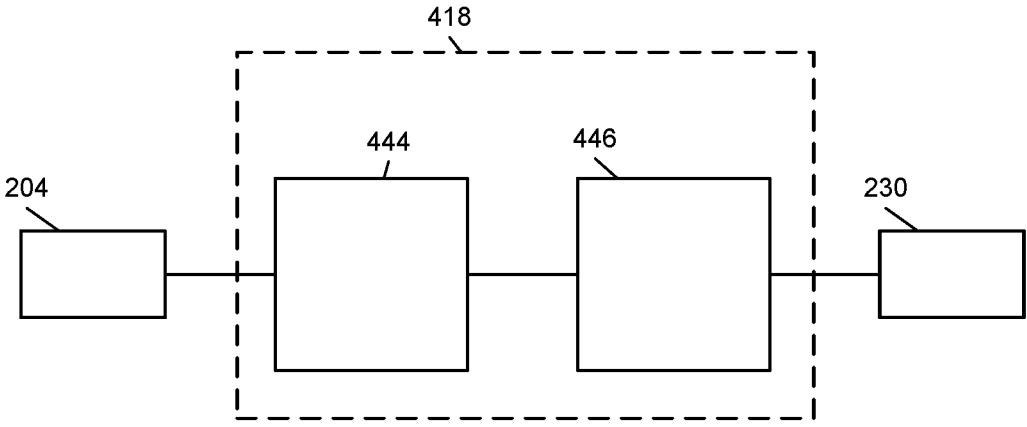
FIG. 4 is a functional block diagram of another two stage DC-DC power converter employable in the ESS of FIG. 1 according to the present disclosure.

Further, each DC-DC power converter 110, 112, 114 may include a single stage or a multi-stage configuration. For example, FIG. 2 illustrates a single stage configuration and FIGS. 3-4 illustrate a multi-stage configuration, each of which may be employed as (or a part of) the DC-DC power converters 110, 112, 114. Specifically, in FIG. 2, a single stage DC-DC power converter 218 is shown coupled between a battery 204 and a low voltage DC bus 230, which may be similar to the battery 104 and the low voltage DC bus 130 of FIG. 1. In such examples, the DC-DC power converter 218 may be an isolated and regulated DC-DC power converter. In FIGS. 3-4, a two-stage DC-DC power converter 318, 418 is coupled between the battery 204 and the low voltage DC bus 230. The DC-DC power converter 318 of FIG. 3 may include, for example, an isolated, unregulated converter circuit 340 coupled to the battery 204 and a non-isolated, regulated converter circuit 342 coupled to the low voltage DC bus 230. The DC-DC power converter 418 of FIG. 4 may include, for example, a non-isolated, regulated converter circuit 444 coupled to the battery 204 and an isolated, unregulated converter circuit 446 coupled to the low voltage DC bus 230.

With continued reference to FIG. 1, each converter circuit 118, 120, 122 may include any suitable converter topology such as, for example, a dual active bridge topology, an interleaved topology, a boost topology, a buck topology, a buck-boost topology, a flyback topology, a push-pull topology, a resonant topology, a zero voltage and/or zero current switching topology, etc. Additionally, each converter circuit 118, 120, 122 may include the same converter topology. In other embodiments, at least one of the converter circuits 118, 120, 122 may have a converter topology that is different than the other converter circuits 118, 120, 122.

Figure 5:
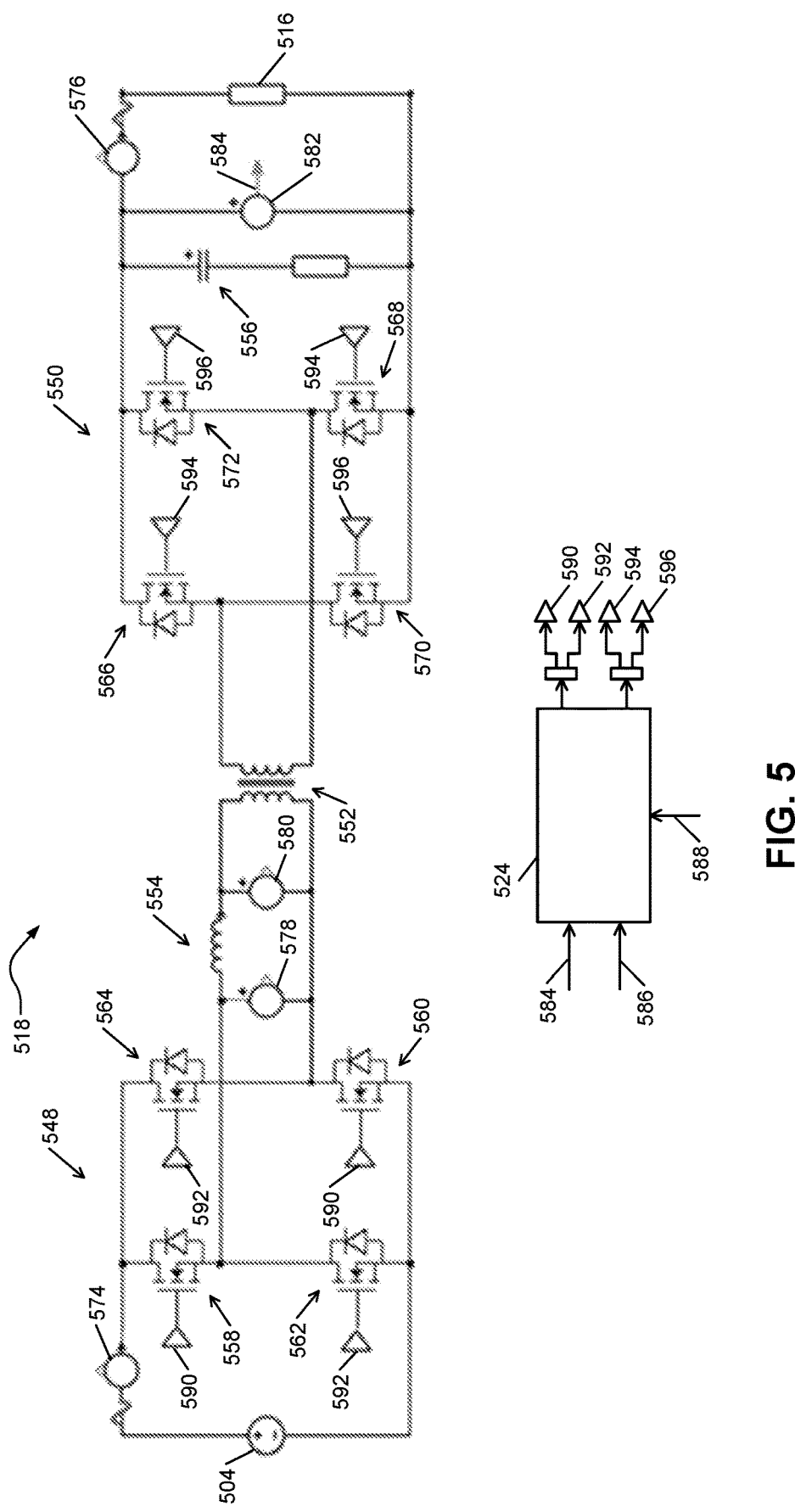
FIG. 5 is a circuit diagram of an example DC-DC power converter employable in the ESS of FIG. 1 according to the present disclosure.

FIG. 5 illustrates a power converter having one example topology suitable for any one of the converter circuits 118, 120, 122 of FIG. 1. Specifically, in FIG. 5, an isolated, bi-directional DC/DC power converter 518 having a dual active full bridge topology, and a controller 524 configured to control the DC/DC power converter 518 are shown. The DC/DC power converter 518 is coupled between a battery 504 and a low voltage battery module 516, which may be similar to the battery 104 and the low voltage battery 116 of FIG. 1.

As shown in FIG. 5, the DC/DC power converter 518 generally includes two bi-directional converter circuits 548, 550, a transformer 552, an inductor 554 (e.g., (discrete or integrated within the transformer 552), and a capacitor 556. The transformer 552 is coupled between the converter circuits 548, 550, the inductor 554 is coupled between the converter circuit 548 and the transformer 552, and the capacitor 556 is coupled across output terminals of the converter circuit 550 and the low voltage battery module 516. When power flows toward the low voltage battery module 516, the converter circuit 548 functions as a DC-AC inverter and the converter circuit 550 functions as an AC-DC rectifier for charging the low voltage battery module 516 (e.g., maintaining a target state of charge of the low voltage battery module 516) and providing power to a low voltage load. When power flows toward the battery 504, the converter circuit 550 functions as a DC-AC inverter and the converter circuit 548 functions as an AC-DC rectifier for charging the battery 504 (e.g., maintaining a target state of charge of the battery 504).

In the example of FIG. 5, each converter circuit 548, 550 includes a bridge of four MOSFETs controllable by the controller 524. Specifically, the converter circuit 548 includes MOSFETs 558, 560, 562, 564 arranged in a full bridge configuration, and the converter circuit 550 includes MOSFETs 566, 568, 570, 572 arranged in another full bridge configuration. The MOSFETs 558, 560, 562, 564, 566, 568, 570, 572 may be, for example, Silicon MOSFETs, SiC MOSFETS, etc. Although the converter circuits 548, 550 are shown as including MOSFETs, it should be appreciated that other suitable switching devices may employed such as, for example, IGBTs, GaN-on-Silicon HEMTs, GaN-Silicon Cascode JFETs, Vertical GaN FETs, power switches (e.g., made from wide band gap semiconductors such as Gallium Oxide, Diamond, etc.), etc. Additionally, in various embodiments, each switching device may include multiple switches in parallel.

The controller 524 may function in a similar manner as any one of the controllers 124, 126, 128 of FIG. 1. For example, controller 524 receives one or more operating characteristics of the power converter 518 and one or more setpoints (e.g., reference values) associated with the operating characteristics. For instance, and as shown in FIG. 5, the power converter 518 includes multiple sensors configured to sense operating characteristics and transmit signals to the controller 524. Specifically, sensors 574, 576 are current sensors for sensing current (e.g., an input or output current) between the converter circuit 548 and the battery 504 and current (e.g., an input or output current) between the converter circuit 550 and the low voltage battery module 516. Additionally, sensors 578, 580, 582 are voltage sensors for sensing a voltage between the converter circuit 548 and the transformer 552 and a voltage between the converter circuit 550 and the low voltage battery module 516. In various embodiments, the voltage sensor 578 may be coupled across terminals of the battery 504 to sense the input voltage of the converter 518. In the particular example of FIG. 5, the controller 524 receives a feedback signal 584 indicative of a voltage Vo sensed by the voltage sensor 582.

Additionally, the controller 524 may receive signals indicative of one or more setpoints and/or a selected operating mode for the power converter 518 via a communication link with, for example, another controller (not shown). For example, in FIG. 5, the controller 524 receives a voltage setpoint signal 586 indicative of a reference voltage Vo_ref associated with the voltage Vo of the power converter 518, and a signal 588 identifying a selected operating mode (e.g., a voltage control mode, a current control mode, a power control mode, etc.) for the power converter 518.

For example, the signal 588 may identify the selected operating mode as a voltage control mode. In such examples, the controller 524 controls the MOSFETs 558, 560, 562, 564, 566, 568, 570, 572 of the converter circuits 548, 550 according to a voltage control mode to regulate the voltage Vo at the low voltage battery module 516. For instance, the controller 524 may compare the sensed voltage Vo (from the feedback signal 584) and the reference voltage Vo_ref (from the voltage setpoint signal 586), and then generate control signals (e.g., PWM control signals, etc.) to regulate the voltage Vo. The control signals are then provided to the MOSFETs 558, 560, 562, 564, 566, 568, 570, 572 via drivers 590, 592, 594, 596, as shown in FIG. 5. In various embodiments, the voltage Vo may be regulated between, for example, about 11.5 VDC and about 15.5 VDC, and the switching frequency may be greater than or equal to about 200 kHz. Additionally, in some examples, the switching frequency may be synchronized to an external clock signal, which may also be used for other converters in an ESS (e.g., the ESS 100 of FIG. 1).

In other embodiments, the signal 588 may identify another operating mode such as a current control mode or a power control mode. In such examples, the controller 524 may receive one or more sensed current and/or voltages from one or more of the current and/or voltage sensors 574, 576, 578, 580, 582 and one or more setpoints associated with the received current and/or voltages, and then control the MOSFETs 558, 560, 562, 564, 566, 568, 570, 572 according to the other another operating mode.

Additionally, in other examples, the controller 524 may select the operating mode in another suitable manner as explained above relative to FIG. 1. For example, the controller 524 may select a default mode as the operating mode when the communication link is inactive, select the operating mode based on an operating condition, etc. as explained herein.

Figure 6:
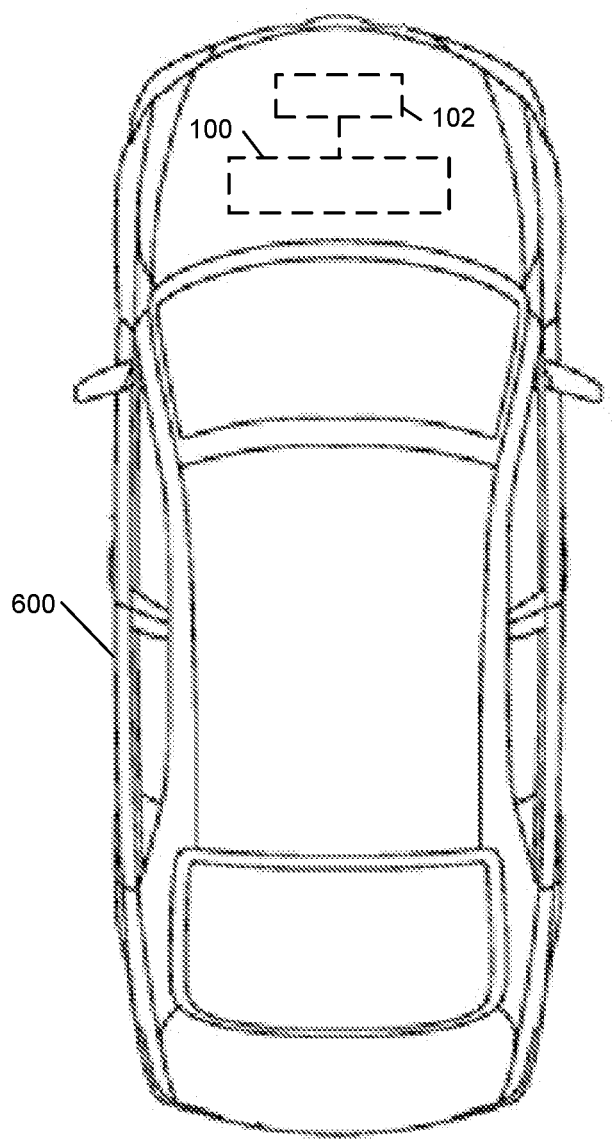
FIG. 6 is a diagram of an electric vehicle (EV) including the ESS of FIG. 1 according to the present disclosure.

In various embodiments, any one of the energy storage systems and/or power converters disclosed herein may be implemented with an EV. For example, FIG. 6 illustrates an EV 600 including the ESS 100 of FIG. 1. In such examples, the ESS 100 may be coupled to one or more low voltage loads (e.g., the low voltage load 102 of FIG. 1, etc.) of the EV 600. In the embodiment of FIG. 6, the EV 600 may be, for example, a pure EV, a hybrid EV, or another suitable type of EV.

Figure 7:
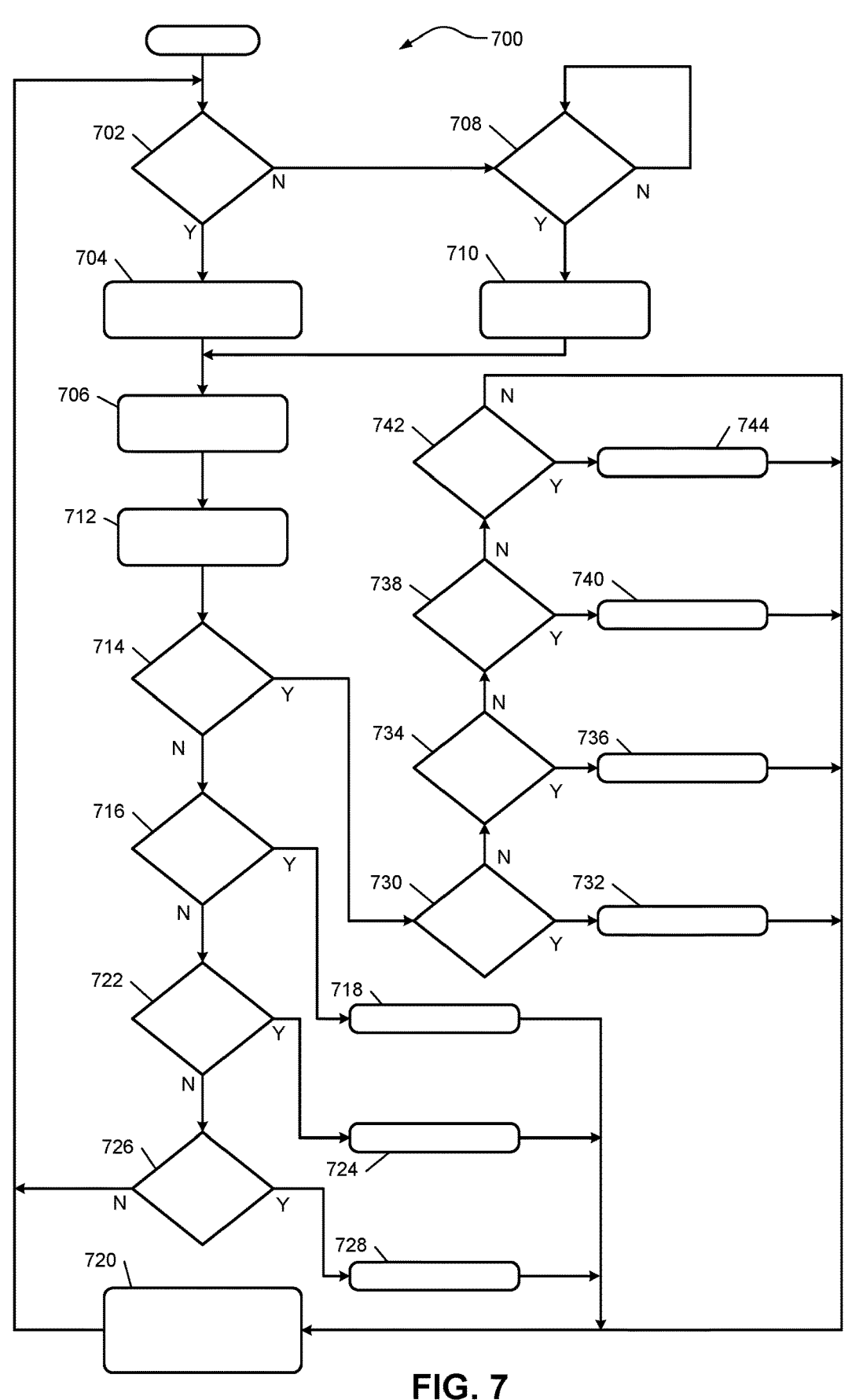
FIG. 7 is a flowchart of a control process for controlling one of the DC-DC power converters of FIG. 1 according to the present disclosure.

FIG. 7 illustrates an example control process 700 employable by the controller 124 of FIG. 1 for controlling the converter circuit 118. Although the example control process 700 is described in relation to the controller 124 and the converter circuit 118, the control process 700 may be employable by any of the controllers disclosed herein.

The control process 700 may start when the controller 124 is powered-on and/or at another suitable time. At this time, the controller 124 may initialize (e.g., assign) default parameters such as an operating mode, set points, threshold limits (e.g., associated with a current, a voltage, a temperature, power, etc.), etc. For example, the default operating mode may be voltage control mode.

As shown in FIG. 7, control begins at 702, where control determines whether a communication link is active. For example, the controller 124 may send a signal to another controller (e.g., the system controller 132 of FIG. 1) over the communication link and wait for a response signal from the other controller. If the response signal is received, the controller 124 may determine that the communication link is active. If the communication link is active, control continues to 704 where the controller 124 receives, via the communication link, various parameters such as an operating mode, set points (e.g., a current set point, a voltage set point, etc.), threshold limits, etc. For example, the controller 124 may receive a selected operating mode (e.g., voltage control mode, etc.) for control of the converter circuit 118. Additionally, in some examples, the controller 124 may receive a polarity of the current set point to indicate the direction of power flow. Control then proceeds to 706.

If the communication link is determined to be inactive at 702, control continues to 708 where the controller 124 determines whether a communication time out has expired. For example, once the communication link is determined to be inactive (e.g., a response signal is not received by the controller 124, etc.), the controller 124 may initiate a clock. If a defined period of time has passed indicating the communication time out has expired, control proceeds to 710. Otherwise, control returns to 708. In other embodiments, control may return to 702 to determine (again) whether the communication link is active.

At 710, control sets various parameters according to the initialized default parameters. For example, if the communication link is inactive and the communication time out has expired, the controller 124 may set the default operating mode (e.g., a voltage control mode, etc.) as the selected operating mode. Control then proceeds to 706.

At 706, control receives operating characteristics of the converter circuit 118. For example, the controller 124 may receive a sensed input voltage Vin, a sensed output voltage Vout, a sensed input current Iin, a sensed output current Iout, a sensed temperature, etc. Control then proceeds to 712, where the controller 124 may determine (if necessary) an input power Pin and/or an output power Pout of the converter circuit 118. For example, the input power and/or an output power may be determined based on the sensed current and voltage. Control then proceeds to 714.

At 714, the controller 124 determines whether the converter circuit 118 is experiencing an over limit condition. For example, the controller 124 may compare the received and/or determined operating characteristics of the converter circuit 118 and the received and/or default threshold limits to determine whether the converter circuit 118 is experiencing an over limit condition.

If the converter circuit 118 is not experiencing an over limit condition, control proceeds to 716. At 716, the controller 124 determines if the selected operating mode is a voltage control mode (e.g., a constant voltage (CV) mode). If no, control proceeds to 722. If yes, control proceeds to 718 where the controller 124 controls the converter circuit 118 according to a voltage control mode. For example, the controller 124 may compare a sensed voltage and a setpoint associated with the sensed voltage, and then generate one or more control signals to regulate the voltage. Control then proceeds to 720.

At 722, the controller 124 determines if the selected operating mode is a current control mode (e.g., a constant current (CC) mode). If no, control proceeds to 726. If yes, control proceeds to 724 where the controller 124 controls the converter circuit 118 according to a current control mode. For example, the controller 124 may compare a sensed current and a setpoint associated with the sensed current, and then generate one or more control signals to regulate the current. Control then proceeds to 720.

At 726, the controller 124 determines if the selected operating mode is a power control mode (e.g., a constant power (CP) mode). If no, control returns to 702. If yes, control proceeds to 728 where the controller 124 controls the converter circuit 118 according to a power control mode. For example, the controller 124 may compare the determined power value (e.g., the determined input power Pin or output power Pout) of the converter circuit 118 and an associated setpoint, and then generate one or more control signals to regulate the power. Control then proceeds to 720.

If the controller 124 detects an over limit condition at 714, the controller 124 may select an appropriate operating mode (e.g., a voltage limit (VL) mode, a current limit (CL) mode, a power limit (PL) mode, a temperature limit (TL) mode, etc.). As such, when the controller 124 detects an over limit condition, the controller 124 may protect the converter circuit 118 by operating in another appropriate operating mode in such a way as to not disturb the operation of other paralleled converter circuits (e.g., the converter circuits 120, 122 of FIG. 1).

Control then proceeds to 730, where the controller 124 determines if the selected operating mode is a TL mode. If so, control proceeds to 732. Otherwise, control proceeds to 734. At 732, the controller 124 may shut down the converter circuit 118. Control then proceeds to 720. In other embodiments, the controller 124 may adjust one or more operating characteristics of the converter circuit 118 to decrease the temperature before shutting down the converter circuit 118 at 732.

At 734, the controller 124 determines if the selected operating mode is a VL mode. If so, control proceeds to 736. Otherwise, control proceeds to 738. At 736, the controller 124 controls the converter circuit 118 according to a VL mode. For example, the controller 124 may control switching devices in the converter circuit 118 to limit the voltage at or below the defined threshold limit associated with the voltage. Control then proceeds to 720.

At 738, the controller 124 determines if the selected operating mode is a CL mode. If so, control proceeds to 740. Otherwise, control proceeds to 742. At 740, the controller 124 controls the converter circuit 118 according to a CL mode. In such examples, the controller 124 may control the switching devices in the converter circuit 118 to limit current flow at or below its associated threshold limit. Control then proceeds to 720.

At 742, the controller 124 determines if the selected operating mode is a PL mode. If so, control proceeds to 744. Otherwise, control proceeds to 720. At 744, the controller 124 controls the converter circuit 118 according to a PL mode by, for example, controlling the switching devices in the converter circuit 118 to limit power at or below its associated threshold limit. Control then proceeds to 720.

At 720, control transmits data relating to the converter circuit 118 to, for example, another controller (e.g., the system controller 132 of FIG. 1). For example, the controller 124 may send the sensed operating characteristics (e.g., the input voltage Vin, the output voltage Vout, the input current Iin, the output current Iout, the temperature, etc.), the determined operating characteristics (e.g., the input power Pin and the output power Pout), the actual operating mode of the converter circuit 118, fault codes, etc. In some examples, the data relating to the converter circuit 118 may be sent via the communication link. Control then returns to 702.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An energy storage system for an electric vehicle, the system comprising:

a plurality of batteries coupled in series;

a plurality of DC-DC power converters each having first and second sides, each of the first sides coupled to one of the batteries, each of the second sides coupled in parallel, each of the DC-DC power converters configured to operate in a plurality of operating modes;

a DC bus coupled to the second sides of the plurality of DC-DC power converters, the DC bus configured to supply power to one or more loads; and at least one controller coupled to at least one DC-DC power converter of the plurality of DC-DC power converters, the at least one controller configured to:

receive a plurality of operating characteristics of the at least one DC-DC power converter and a plurality of setpoints;

select an operating mode of the plurality of operating modes for the at least one DC-DC power converter; and control the at least one DC-DC power converter to operate in the selected operating mode based on at least one of the plurality of operating characteristics and at least one of the plurality of setpoints.

2. The energy storage system of claim 1, the plurality of operating modes includes a voltage control mode, a current control mode, and a power control mode.

3. The energy storage system of claim 1, wherein:

the at least one controller is a first controller;

the at least one DC-DC power converter is a first DC-DC power converter;

the plurality of setpoints is a first plurality of setpoints;

the energy storage system further comprises a second controller coupled to a second DC-DC power converter of the plurality of DC-DC power converters; and the second controller is configured to:

receive a plurality of operating characteristics of the second DC-DC power converter and a second plurality of setpoints;

select an operating mode of the plurality of operating modes for the second DC-DC power converter; and control the second DC-DC power converter to operate in the selected operating mode based on at least one of the plurality of operating characteristics of the second DC-DC power converter and at least one of the second plurality of setpoints.

4. The energy storage system of claim 1, wherein the at least one controller is configured:

determine whether a communication link between the at least one controller and another controller is active;

in response to determining the communication link is active:

receive, via the communication link, a signal identifying the operating mode; and select the operating mode of the plurality of operating modes based on the received signal.

5. The energy storage system of claim 4, wherein the at least one controller is configured select a defined default mode as the operating mode in response to determining the communication link is inactive.

6. The energy storage system of claim 5, wherein the at least one controller is configured to select the defined default mode in response to the communication link being inactive for a defined period of time.

7. The energy storage system of claim 5, wherein the defined default mode includes one of a voltage control mode, a current control mode, and a power control mode.

8. The energy storage system of claim 1, wherein the plurality of DC-DC power converters include at least one of a bi-directional DC-DC power converter or an unidirectional DC-DC power converter.

9. The energy storage system of claim 8, wherein each of the plurality of DC-DC power converters has the same converter topology.

10. The energy storage system of claim 8, wherein the at least one DC-DC power converter has a different converter topology than another one of the plurality of DC-DC power converters.

11. The energy storage system of claim 1, wherein the at least one controller is configured to:

determine whether one of the received operating characteristics of the at least one DC-DC power converter exceeds a defined limit threshold; and in response:

select another operating mode based on the one of the received operating characteristics; and control the at least one DC-DC power converter to operate in the other operating mode.

12. The energy storage system of claim 11, wherein the other operating mode includes at least one of a voltage limit mode, a current limit mode, a power limit mode, and a temperature limit mode.

13. An electric vehicle comprising the energy storage system of claim 1 and one or more loads coupled to the energy storage system.

14. A method for controlling a plurality of DC-DC power converters of an energy storage system, each DC-DC power converter having first and second sides, each of the first sides coupled to one of a plurality of batteries of the energy storage system, each of the second sides coupled in parallel and to a DC bus, each of the DC-DC power converters configured to operate in a plurality of operating modes, the method comprising:

receiving a plurality of operating characteristics of at least one DC-DC power converter of the plurality of DC-DC power converters and a plurality of setpoints;

selecting an operating mode of the plurality of operating modes for the at least one DC-DC power converter; and controlling the at least one DC-DC power converter to operate in the selected operating mode based on at least one of the received operating characteristics and at least one of the received set points.

15. The method of claim 14, wherein the plurality of operating modes includes a voltage control mode, a current control mode, and a power control mode.

16. The method of claim 14, further comprising receiving a signal identifying the operating mode, wherein selecting the operating mode for the at least one DC-DC power converter includes selecting the operating mode based on the received signal.

17. The method of claim 14, wherein selecting the operating mode for the at least one DC-DC power converter includes selecting a defined default mode as the operating mode.

18. The method of claim 17, wherein selecting the defined default mode as the operating mode includes selecting the defined default mode in response to a communication link being inactive for a defined period of time.

19. The method of claim 14, further comprising:

determining whether one of the received operating characteristics of the at least one DC-DC power converter exceeds a defined limit threshold; and in response:

selecting another operating mode based on the one of the received operating characteristics; and controlling the at least one DC-DC power converter to operate in the other operating mode.

20. The method of claim 19, wherein the other operating mode includes at least one of a voltage limit mode, a current limit mode, a power limit mode, and a temperature limit mode.

* * * * *